US012619913B2

(12) United States Patent (10) Patent No.: US 12,619,913 B2
Nakao et al. (45) Date of Patent: May 5, 2026

(54) DATA CREATION DEVICE, PROGRAM CREATION DEVICE, OBJECT DETECTION DEVICE, DATA CREATION METHOD, AND OBJECT DETECTION METHOD

(71) Applicant: MITSUBISHI HEAVY INDUSTRIES, LTD., Tokyo (JP)

(72) Inventors: Kenta Nakao, Tokyo (JP); Kiichi Sugimoto, Tokyo (JP); Satoshi Iio, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 899 days.

(21) Appl. No.: 17/912,661

(22) PCT Filed: Dec. 25, 2020

(86) PCT No.: PCT/JP2020/048935
§ 371 (c)(1),
(2) Date: Sep. 19, 2022

(87) PCT Pub. No.: WO2021/199540
PCT Pub. Date: Oct. 7, 2021

(65) Prior Publication Data
US 2023/0142455 A1 May 11, 2023

(30) Foreign Application Priority Data
Mar. 31, 2020 (JP) ................................. 2020-063280

(51) Int. Cl.
*G06N 20/00* (2019.01)
(52) U.S. Cl.
CPC ................................... *G06N 20/00* (2019.01)

(58) Field of Classification Search
CPC ...................................................... G06N 20/00
See application file for complete search history.

(56) References Cited

U.S. PATENT DOCUMENTS 9,886,646 B2 2/2018 Fukui et al.
2017/0206431 A1 7/2017 Sun et al.
(Continued)

FOREIGN PATENT DOCUMENTS

CN 110046572 A 7/2019
CN 110298298 A 10/2019
(Continued)

OTHER PUBLICATIONS

Aston Zhang et al. "Anchor boxes", Dive into Deep Learning; https://zh.d21.ai/chapter_computer-vision/anchor.html, https://d21. ai/chapter_computer-vision/anchor.html, vol. 13.4, pp. 581-595, Apr. 1, 2013 (27 Pages with English Translation).
(Continued)

*Primary Examiner* — Kris E Mackes
(74) *Attorney, Agent, or Firm* — Osha Bergman Watanabe & Burton LLP

(57) ABSTRACT

A data creation device that is a training data creation device for creating training data which is used for deep learning of an object detection program for detecting whether or not an object is included in an image, includes: an acquisition unit that acquires an anchor that is information on a frame specifying an area for each cell for detecting presence or absence of the object from the image; and a creation unit that associates area information of the object with image data to create the training data that includes a plurality of image data in which the area information is included. The creation unit determines a frame of the area information, based on a position of the anchor.

18 Claims, 12 Drawing Sheets

(56)     References Cited

U.S. PATENT DOCUMENTS

| | | | |
|---|---|---|---|
| 2018/0039853 A1 | 2/2018 | Liu et al. | |
| 2018/0068198 A1* | 3/2018 | Savvides | G06V 10/82 |
| 2019/0108411 A1 | 4/2019 | Liu et al. | |
| 2019/0130189 A1* | 5/2019 | Zhou | G06V 10/7515 |
| 2019/0130580 A1* | 5/2019 | Chen | G06V 10/82 |
| 2019/0258878 A1* | 8/2019 | Koivisto | G05D 1/00 |
| 2020/0175384 A1* | 6/2020 | Zhang | G06N 3/082 |
| 2021/0056708 A1 | 2/2021 | Li | |
| 2021/0097354 A1* | 4/2021 | Amato | G06V 30/2504 |
| 2023/0334871 A1* | 10/2023 | Wang | G06T 7/80 |

FOREIGN PATENT DOCUMENTS

| | | |
|---|---|---|
| JP | 5172749 B2 | 3/2013 |
| JP | 2017-146840 A | 8/2017 |
| JP | 2018022484 A | 2/2018 |
| JP | 2018-165948 A | 10/2018 |

OTHER PUBLICATIONS

Office Action issued in corresponding CN Application No. 202080098617.5, dated Aug. 1, 2025 (27 Pages with English Translation).

Office Action in corresponding U.S. Appl. No. 17/170,244, dated Feb. 23, 2023 (16 pages).

* cited by examiner

100

10

CALCULATION UNIT 16

STORAGE UNIT 18

| INPUT UNIT 12 |
| OUTPUT UNIT 14 |

| TRAINING DATA CREATION UNIT 30 |
| ANCHOR SETTING UNIT 32 |
| LEARNING UNIT 34 |
| OBJECT DETECTION PROCESSING UNIT 36 |

| IMAGE DATA 40 |
| SETTING DATA 42 |
| LEARNING EXECUTION PROGRAM 44 |
| ANCHOR SETTING PROGRAM 46 |
| OBJECT DETECTION PROGRAM 48 |
| TRAINED PROGRAM 50 |

102

STORAGE UNIT 116

| CAMERA UNIT 112 |
| CALCULATION UNIT 114 |

| 120 | 122 |

| NOTIFICATION UNIT 118 |

START

S12 READ OUT ANCHOR INFORMATION

S14 READ OUT IMAGE DATA THAT INCLUDES AREA INFORMATION OF OBJECT

S16 CALCULATE IoU OF ANCHOR OF EACH CELL AND OF TARGET AREA

S18 SPECIFY ANCHOR HAVING HIGHEST IoU

S20 MOVE POSITION OF AREA INFORMATION, BASED ON ANCHOR HAVING HIGHEST IoU

END

DATA CREATION DEVICE, PROGRAM CREATION DEVICE, OBJECT DETECTION DEVICE, DATA CREATION METHOD, AND OBJECT DETECTION METHOD

TECHNICAL FIELD

The present invention relates to a data creation device, a program creation device, an object detection device, a data creation method, and an object detection method.

BACKGROUND ART

As a system for detecting an object from an acquired image, there is a system for detecting an object by using a trained program in which deep learning is performed with a large number of images. In object detection using general deep learning, first, a feature quantity is extracted by performing convolution processing using a specific filter coefficient with respect to an input image. Next, in a feature quantity space with a different resolution obtained in the process of the convolution processing, a rectangular area (a bounding box) called an anchor is disposed, and a score indicating object-likeness is calculated from the feature quantity in the area for each anchor. An anchor whose score is equal to or higher than a threshold value is adjusted in size by regression processing by using the calculated score, and is output as a detection result.

CITATION LIST

Patent Literature

[PTL 1] Japanese Unexamined Patent Application Publication No. 2017-146840
[PTL 2] Japanese Unexamined Patent Application Publication No. 2018-165948

SUMMARY OF INVENTION

Technical Problem

In deep learning, the accuracy of detecting an object can be improved by setting a plurality of types of anchor shapes and performing detection of an object by using anchors having different shapes. However, if the number of anchors increases, the amount of processing of the arithmetic processing also increases. Further, if the choice of an anchor to be used increases, the amount of processing when deciding the conditions for the deep learning also increases. Due to the above, it is required to improve the accuracy of detecting an object while suppressing the amount of processing.

At least one embodiment of the present disclosure has, in order to solve the above problem, an object to provide a data creation device, a program creation device, an object detection device, a data creation method, and an object detection method, in which it is possible to detect an object with high accuracy while suppressing the amount of processing.

Solution to Problem

According to the present disclosure, there is provided a data creation device that is a training data creation device for creating training data which is used for deep learning of an object detection program for detecting whether or not an object is included in an image, the device including: an acquisition unit that acquires an anchor that is information on a frame specifying an area for each cell for detecting presence or absence of the object from the image; and a creation unit that associates area information of the object with image data to create the training data that includes a plurality of image data in which the area information is included, in which the creation unit determines a frame of the area information, based on a position of the anchor.

Further, according to the present disclosure, there is provided a program creation device including: the training data creation device described above; and a learning unit that performs deep learning on the training data created by the training data creation device to create a trained program for extracting an object from an image.

Further, according to the present disclosure, there is provided an object detection device including: a storage unit that stores a trained program created by associating area information of an object with image data and performing deep learning on training data that includes a plurality of image data in which the area information is included; and a calculation unit that executes the trained program stored in the storage unit, processes image data of an area that is included in an anchor set with respect to a cell, and executes object detection processing from the image data, in which the calculation unit executes the trained program with respect to the image data, calculates a score in each cell, and determines that there is an object in a case where there is a cell whose score is equal to or higher than a first threshold value, and determines that there is an object at a boundary of an anchor when the score satisfies a predetermined condition, based on a score of a cell and a score of a cell related to the cell, in a case where there is no cell whose score is the first threshold value.

Further, according to the present disclosure, there is provided an object detection device including: a storage unit that stores a trained program created by associating area information of an object with image data and performing deep learning on training data that includes a plurality of image data in which the area information is included; and a calculation unit that executes the trained program stored in the storage unit, processes image data of an area that is included in an anchor set with respect to a cell, and executes object detection processing from the image data, in which the calculation unit executes the trained program with respect to the image data, calculates a score in each cell, creates image data in which a position of the image data is moved by a distance shorter than the cell in which an anchor is installed, executes the trained program, repeats processing of calculating the score in each cell, and executes the object detection processing from the image data, based on score calculation results with respect to a plurality of image data whose positions have been moved.

Further, according to the present disclosure, there is provided a data creation method for creating training data which is used for deep learning of an object detection program for detecting whether or not an object is included in an image, the method including: a step of acquiring an anchor which is information on a frame specifying an area for each cell for detecting presence or absence of the object from the image; and a step of associating area information of the object with image data to create training data that includes a plurality of image data in which the area information is included, in which in the step of creating the training data, a frame of the area information is determined based on a position of the anchor.

Further, according to the present disclosure, there is provided an object detection method including: a step of storing a trained program created by associating area information of an object with image data and performing deep learning on training data that includes a plurality of image data in which the area information is included; and a step of executing the stored trained program, processing image data of an area that is included in an anchor set with respect to a cell, and executing object detection processing from the image data, in which in the step of executing object detection processing, the trained program is executed with respect to the image data, a score of each cell is calculated, and in a case where there is a cell whose score is equal to or higher than a first threshold value, it is determined that there is an object, and in a case where there is no cell whose score is the first threshold value, it is determined that there is an object at a boundary of the anchor when the score satisfies a predetermined condition, based on a score of a cell and a score of a cell related to the cell.

Further, according to the present disclosure, there is provided an object detection method including: a step of storing a trained program created by associating area information of an object with image data and performing deep learning on training data that includes a plurality of image data in which the area information is included; and a step of executing the stored trained program, processing image data of an area that is included in an anchor set with respect to a cell, and executing object detection processing from the image data, in which in the step of executing object detection processing, the trained program is executed with respect to the image data, a score of each cell is calculated, image data in which a position of the image data is moved by a distance shorter than the cell in which an anchor is installed is created, the trained program is executed, processing of calculating a score in each cell is repeated, and the object detection processing is executed from the image data, based on score calculation results with respect to a plurality of image data whose positions have been moved.

Advantageous Effects of Invention

With the above configuration, the effect of being able to detect an object with high accuracy while suppressing the amount of processing is exhibited.

DESCRIPTION OF EMBODIMENTS

Hereinafter, embodiments according to the present disclosure will be described in detail based on the drawings. The present invention is not limited to these embodiments. Further, components that can be easily replaced by those skilled in the art, or components that are substantially the same are included in components in the following embodiments. Further, the components described below can be appropriately combined, and in a case where there are a plurality of embodiments, each embodiment can be combined.

<Object Detection System>

Figure 1:
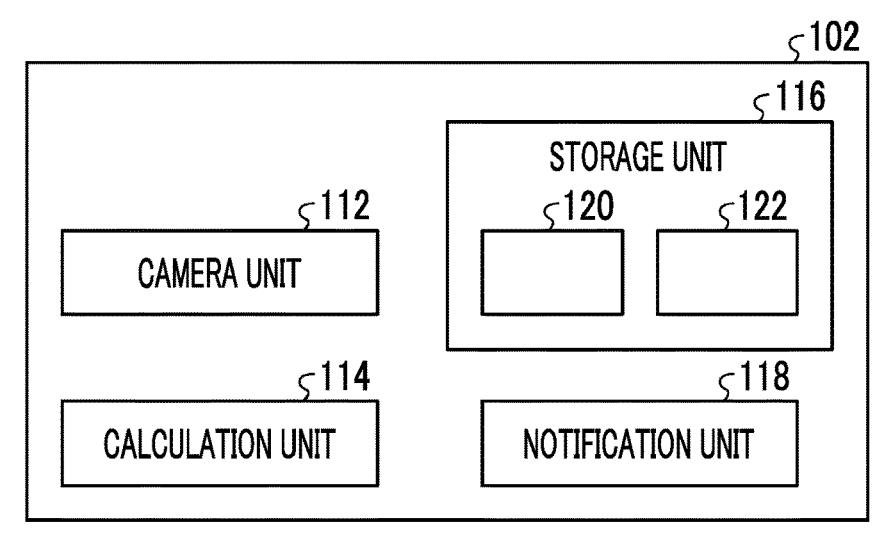
FIG. 1 is a block diagram showing an example of an object detection system.

FIG. 1 is a block diagram showing an example of an object detection system. An object detection system 100 according to the present embodiment includes a program creation device 10 and an object detection device 102. The object detection system 100 creates a trained program which can execute object detection processing of performing object detection from an image by using deep learning in the program creation device 10, and executes the trained program to perform object detection in the object detection device 102. Further, the program creation device 10 of the present embodiment also has a function as an object detection device. The object detection device 102 is installed at, for example, a moving body such as a vehicle or a flying body, or a building. Further, the object is not particularly limited, and various types of objects such as a human, a machine, a dog, a cat, a vehicle, and a plant can be targeted.

The program creation device 10 includes an input unit 12, an output unit 14, a calculation unit 16, and a storage unit 18. The input unit 12 includes an input device such as a keyboard and a mouse, a touch panel, or a microphone for collecting sounds of utterance from an operator, and outputs a signal corresponding to an operation performed on the input device by the operator to the calculation unit 16. The output unit 14 includes a display device such as a display, and displays a screen including various information such as a processing result or an image to be processed, based on a display signal output from the calculation unit 16. Further, the output unit 14 may include a recording device that outputs data on a recording medium. Further, the program creation device 10 may include a communication unit that transmits data by using a communication interface as the input unit 12 and the output unit 14. The communication unit sends various data and programs acquired by communication with an external device to the storage unit 18 to store them in the storage unit 16. The communication unit may be connected to the external device by a wired communication line or may be connected to the external device by a wireless communication line.

The calculation unit 16 includes an integrated circuit (a processor) such as a CPU (Central Processing Unit) or a GPU (Graphics Processing Unit), and a memory as a work area, and executes various types of processing by executing various programs by using these hardware resources. Specifically, the calculation unit 16 reads out the program stored in the storage unit 18 to expand the program in the memory, and executes various types of processing by causing the processor to execute commands included in the program expanded in the memory. The calculation unit 16 includes a training data creation unit (an example of a data creation unit) 30, an anchor setting unit (an example of an acquisition unit or a setting unit) 32, a learning unit 34, and an object detection processing unit (an example of a processing unit) 36. The storage unit 18 will be described before the description of each unit of the calculation unit 16. The program creation device 10 of the present embodiment can execute the processing of the data creation device for creating training data by combining the functions of the training data creation unit 30 and the anchor setting unit 32.

The storage unit 18 is composed of a non-volatile storage device such as a magnetic storage device or a semiconductor storage device, and stores various programs and data. The storage unit 18 includes image data 40, setting data 42, a learning execution program 44, an anchor setting program 46, an object detection program 48, and a trained program 50.

Further, as data that is stored in the storage unit 18, the image data 40 and the setting data 42 are included. The image data 40 includes training data that is used for learning. The training data is data in which image data and an area (a bounding box) in which an object is displayed in a case where the object is included in an image are associated with each other. The image of the training data may be divided into data that is used for learning and data for evaluating the accuracy of the program after learning. Further, the image data may include image data that needs to detect an object. The setting data 42 includes anchor setting information (described later), information on conditions for executing the trained program, or the like.

As the programs that are stored in the storage unit 18, there are the learning execution program 44, the anchor setting program 46, the object detection program 48, and the trained program 50. The learning execution program 44 performs deep learning processing on the training data included in the image data 40, based on the setting of the setting data 42, to create the trained program 50. As a deep learning model, it is possible to use a deep learning model that detects whether or not an object is included in an image, by setting a bounding box called a so-called anchor, such as R-CNN (Regions with Convolutional Neural Networks), YOLO (You Only Look Once), or SSD (Single Shot multibox Detector), with respect to an image, and by processing a feature quantity in the anchor based on the setting.

The anchor setting program 46 executes processing of setting an anchor that is used when executing image processing by using the deep learning model with the learning execution program 44 and the trained program. The anchor setting program 46 executes processing of setting the size of an anchor. Further, it is preferable that the anchor setting program 46 executes processing of setting the aspect ratio of an anchor and the number of anchors that are used. The information set by the anchor setting program 46 is stored in the setting data 42.

The object detection program 48 is a program for executing object detection processing by using the trained program 50. The object detection program 48 also sets image acquisition processing, processing of determining the presence or absence of an object, and processing of outputting a determination result. The object detection program 48 may set processing of working image data. The trained program 50 is a program created by executing the learning execution program 44. The object detection program 48 can calculate a feature quantity (a score) serving as a learning determination criterion by executing the trained program 50 in a calculation unit that performs image processing, and executes processing of detecting an object, based on the feature quantity.

The storage unit 18 reads the learning execution program 44, the anchor setting program 46, and the object detection program 48 recorded on a recording medium, so that the learning execution program 44, the anchor setting program 46, and the object detection program 48 may be installed, or reads the learning execution program 44, the anchor setting program 46, and the object detection program 48 that are provided on a network, so that the learning execution program 44, the anchor setting program 46, and the object detection program 48 may be installed.

The function of each unit of the calculation unit 16 will be described. Each unit of the calculation unit 16 can be executed by executing the program stored in the storage unit 18. In a case where there is an object in the image data, the training data creation unit 30 associates frame information (a bounding box) indicating the area of the object. The frame to be set is a rectangle. The training data creation unit 30 sets frame information from an operation that is input to the input unit 12, for example, in a state where an image is displayed on the output unit 14. The operation that is input to the input unit 12 is an operation of inputting information on a position surrounding a frame position (an object), which is performed by an operator while looking at an image. Further, the training data creation unit 30 may acquire the result of image extraction processing executed by the object detection processing unit 36. In this case, the operator's operation of determining whether the extracted frame position is correct answer data of the training data may be detected, and the data determined by the operator that the frame position is correct may be acquired as the training data.

The anchor setting unit 32 executes the processing of the anchor setting program 46, and sets anchor information that is used in the image processing of the deep learning model that is executed in the learning unit 34 and the object detection processing unit 36. In a case of setting the anchor information, the anchor setting unit 32 acquires anchor information serving as a reference. The anchor setting unit 32 supplies the anchor information to the training data creation unit 30. The anchor setting unit 32 is an acquisition unit that acquires anchor information when creating training data. The processing of the anchor setting unit 32 will be described later.

The learning unit 34 executes the processing of the learning execution program 44 by using the anchor setting set by the anchor setting unit 32, performs deep learning as the training data of the image data 40, and creates a trained program. The processing of the learning unit 34 will be described later.

The object detection processing unit 36 processes the trained program 50 by using the object detection program 48, and executes processing of determining whether or not an object is included in the acquired image, that is, object detection processing. The processing of the object detection processing unit 36 will be described later.

In the present embodiment, a configuration is made in which the program creation device 10 includes the training data creation unit 30 and the object detection processing unit 36. However, the program creation device 10 does not need to include them. That is, the training data may be created by another device. In this case, a device that realizes the function of the training data creation unit 30 serves as the training data creation device. Further, the object detection processing unit 36 that executes processing of detecting an object from an image may be provided only in the object detection device 102.

The object detection device 102 is installed at a moving body or a building, as described above. The object detection device 102 may be capable of communicating with the program creation device 10. However, the object detection device 102 does not need to have a communication function. The object detection device 102 having no communication function has various processing conditions set in advance, and executes the object detection processing, based on the set conditions. The object detection device 102 may output the detection result to a control device that controls an installed mechanism. In this way, for example, in the case of a moving body, when an object is detected, it is possible to execute stopping processing, processing of avoiding the object, or the like.

The object detection device 102, includes a camera unit 112, a calculation unit 114, a storage unit 116, and a notification unit 118. The camera unit 112 acquires an image of a target field of view. The camera unit 112 may continuously acquire images at a predetermined frame rate, or may acquire an image with a predetermined operation as a trigger.

The calculation unit 114 includes an integrated circuit (a processor) such as a CPU or a GPU, and a memory as a work area, and executes various types of processes by executing various programs by using these hardware resources. Specifically, the calculation unit 114 reads out the program stored in the storage unit 116 to expand it in the memory, and executes various types of processing by causing the processor to execute commands included in the program expanded in the memory. The calculation unit 114 executes processing of detecting an object from an image by executing a program stored in the storage unit 116.

The storage unit 116 is composed of a non-volatile storage device such as a magnetic storage device or a semiconductor storage device, and stores various programs and data. The storage unit 116 stores an object detection program 120 and a trained program 122.

The notification unit 118 gives notice to an operator. The notification unit 118 is a speaker, a light emitting device, a display, or the like. The notification unit 118 notifies an operator that there is an object, in a case where processing is executed by the calculation unit 114 and an object included in an image is detected. In a case where an object is a person, the notification unit 118 may give notice to the person who is a detection target.

Figure 2:
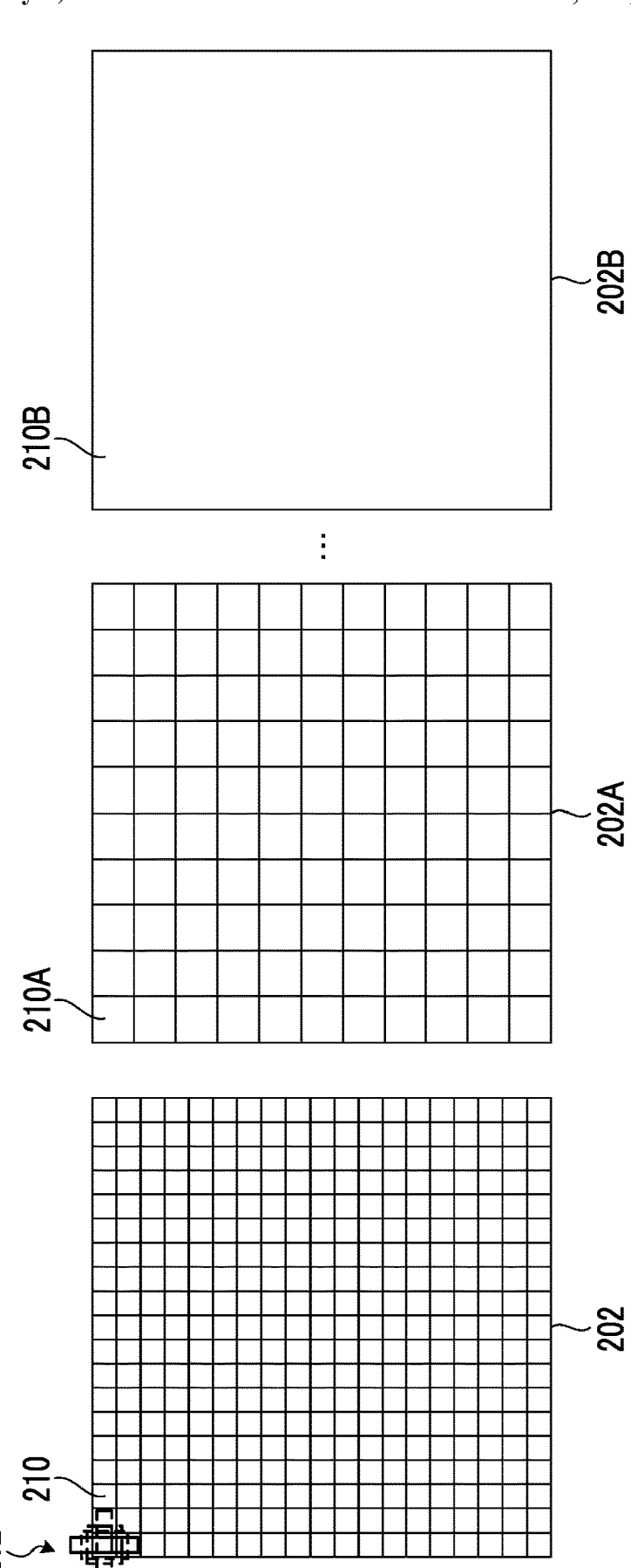
FIG. 2 is an explanatory diagram for explaining an example of image processing of the object detection system.
Figure 3:
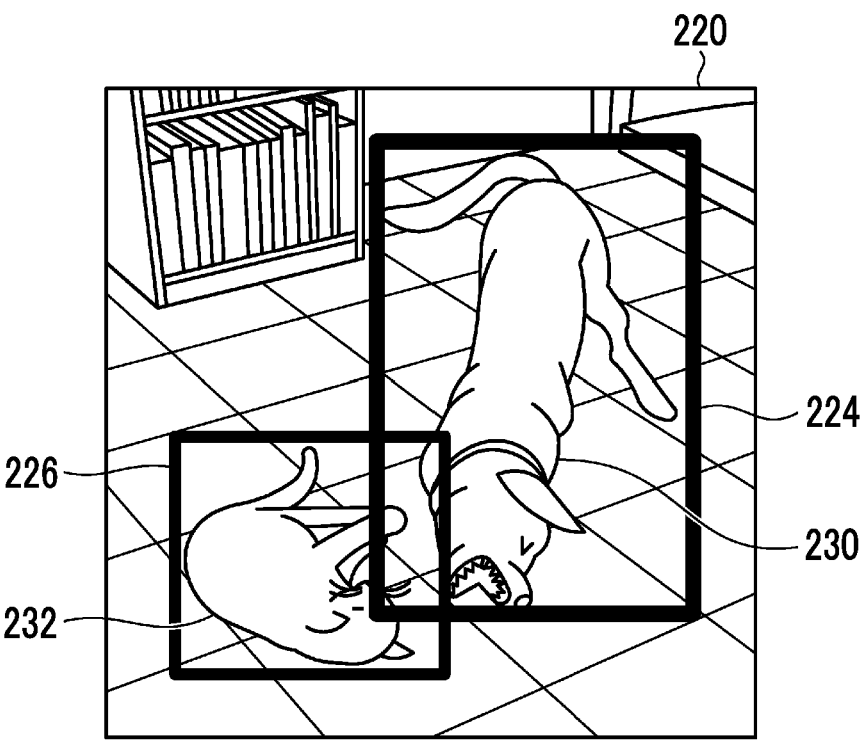
FIG. 3 is an explanatory diagram for explaining an example of the image processing.
Figure 4:
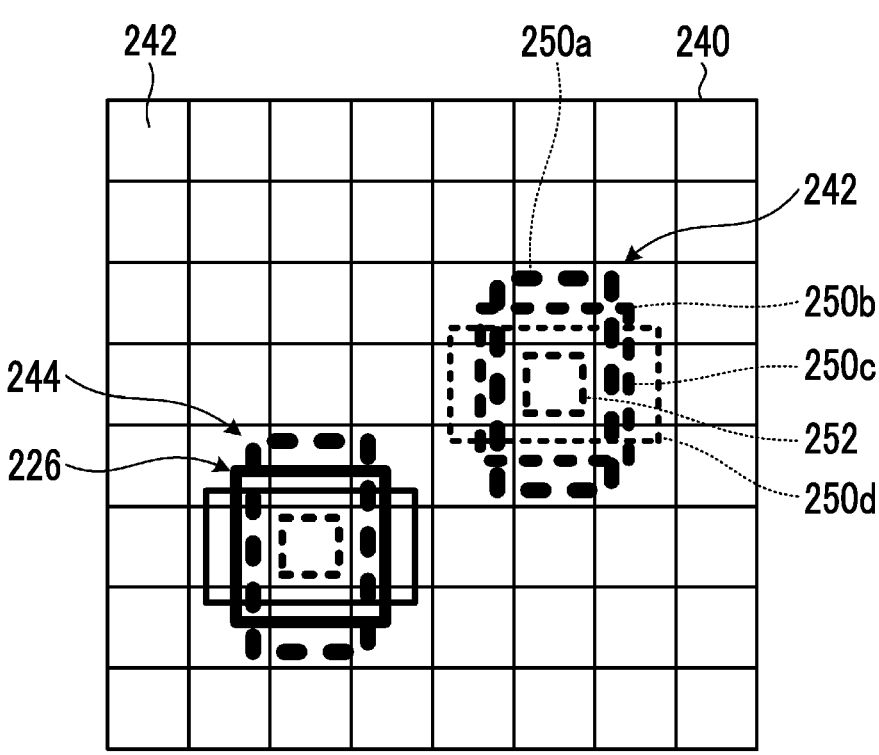
FIG. 4 is an explanatory diagram for explaining an example of the image processing.
Figure 5:
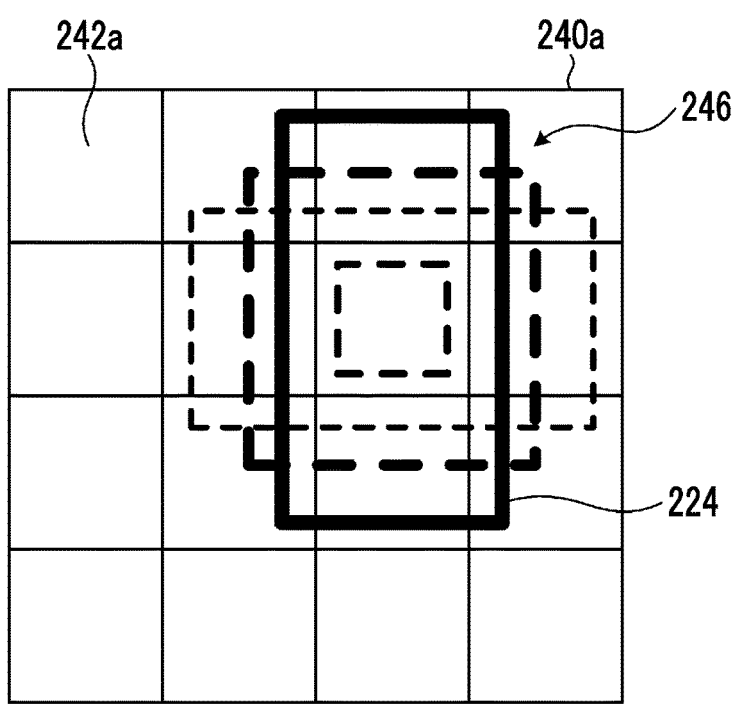
FIG. 5 is an explanatory diagram for explaining an example of the image processing.

FIG. 2 is an explanatory diagram for explaining an example of the image processing of the object detection system. Each of FIGS. 3 to 5 is an explanatory diagram for explaining an example of the image processing.

The object detection processing unit 36 of the present embodiment determines whether or not an object is included in an image, by performing image processing via the set deep learning. The learning unit 34 creates a trained program to be executed in the object detection processing unit 36 by performing machine learning, for example, deep learning by using the training data created in the training data creation unit 30.

Here, the deep learning in the present embodiment is setting of performing convolution processing or the like on a target image, creating a plurality of images in which the number of divisions for dividing an image is different, that is, the size of one cell in the processing is different, and executing processing using a set anchor in each cell of each image, as shown in FIG. 2.

That is, as shown in FIG. 2 with respect to one image, a feature quantity map 202 is processed to create a feature quantity map 202A having a number of divisions smaller than that in the feature quantity map 202. In the feature quantity map 202A, one cell 210A occupies a larger proportion of the entire image than in a cell 210. The same processing is executed a plurality of times on the feature quantity map 202A to create a feature quantity map 202B in which only one cell (area) 210B is set. Here, in the processing when transitioning to a different number of divisions, various parameters are set in arithmetic processing that is executed in the deep learning.

Here, in setting of the deep learning, an anchor 212 is set as information on a frame for acquiring information in order to calculate the evaluation of one cell. The anchor 212 in the present embodiment is set such that the center thereof coincides with the center of the cell to be evaluated. Further, the size of the anchor 212 with respect to the cell is set, and if the cell becomes larger, the anchor 212 also becomes larger. Further, a plurality of anchors 212 to be processed by the deep learning are set.

Next, the training data will be described. FIG. 3 is an image 220 that includes a dog 230 and a cat 232. In object detection, in a case where an object is a dog, a frame 224 is set in the area where the dog 230 is displayed. The frame 224 is area information, and is information indicating that an object is displayed, that is, a bounding box. The frame 224 serves as position information on the image 220. Further, in a case where an object is a cat, a frame 226 is set in the area where the cat 232 is displayed. Further, in a case where an object is an animal, there is a case where both the frame 224 and the frame 226 are set with respect to one image 220. As shown in FIG. 3, information in which information on the frames 224 and 226 surrounding the objects is associated with the image 220 becomes correct answer data and image data of the training data.

The object detection system 100 creates a trained model capable of extracting an object, by performing learning processing while applying the set anchor to each cell, with respect to training data for the data of a plurality of images including the image 220 that includes information on the frames 224 and 226 of the image data.

FIGS. 4 and 5 schematically show states of analyzing the image of FIG. 3. In a feature quantity map (a division map) 240 shown in FIG. 4, the image is divided into 8 rows and 8 columns. In a feature quantity map 240a shown in FIG. 5, the image is divided into 4 rows and 4 columns. In the feature quantity map 240, as shown in an anchor unit 242 corresponding to a cell 252, a plurality of anchors 250a, 250b, 250c, and 250d having different aspect ratios are applied with respect to each cell, and with respect to each anchor, the comparison of the feature quantity of the image that is included in the area of the anchor is performed. The same applies to the feature quantity map 240a.

In the case of the image 220 shown in FIG. 3, in the frame 226 of the cat 232, an anchor that coincides with an anchor unit 244 in which an image area is divided to the size of a cell 242 is detected in the feature quantity map 240 shown in FIG. 4. The anchor corresponding to the frame 224 of the dog 230 is not detected in the anchor of the feature quantity map 240 because the size is different. The anchor corresponding to the frame 224 of the dog 230 is detected with an anchor that is included in an anchor unit 246 that is set in the feature quantity map 240a having a small number of divisions.

In this manner, the object detection system 100 detects whether or not an object is included in image data, by processing an image in an anchor via deep learning by applying an anchor to each cell of a feature quantity map.

Here, in an area where an object is displayed, that is, training data, if a state where the degree of coincidence, which is an overlapping ratio of a bounding box and an anchor, is high can be maintained, the learning accuracy also becomes high, and an object can be detected with high accuracy. Here, the degree of coincidence is evaluated by IoU (Intersection over Union). Specifically, it is a percentage of (coincidence portion of bounding box and anchor)/(union of bounding box and anchor). On the other hand, in an area where an object is displayed, that is, the training data, if there is a bounding box at a boundary of an anchor, the degree of coincidence becomes low at any anchor at the time of the deep learning, and the amount of learning in the deep learning does not increase, so that there is a case where an object cannot be detected by the trained program. Further, even at the time of actual detection, there is a case where an anchor having a high coincidence rate with an area in which an object is included is not created and detection is not possible. In contrast, the object detection system 100 executes the following processing.

<Training Data Creation Method>

Figure 6:
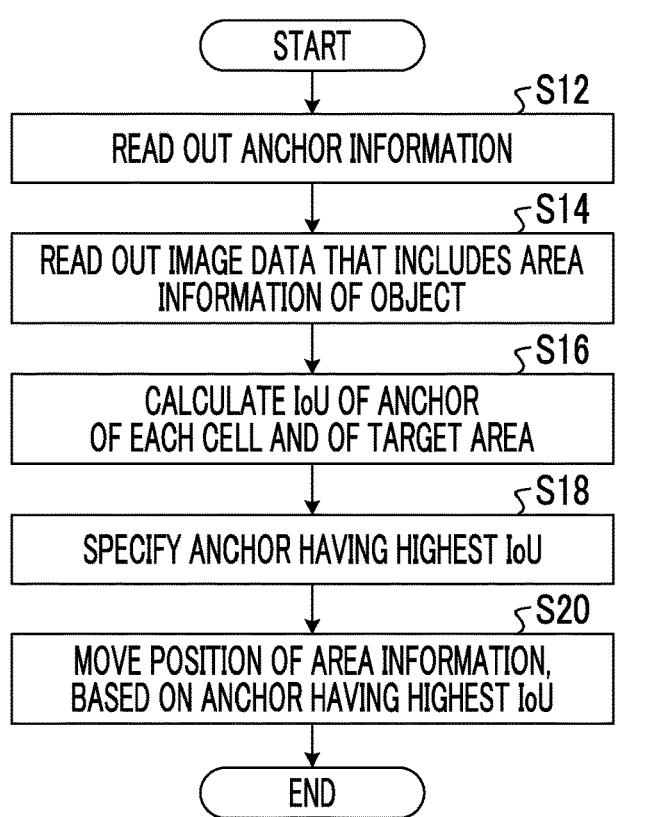
FIG. 6 is a flowchart showing an example of processing of a training data creation unit.
Figure 7:
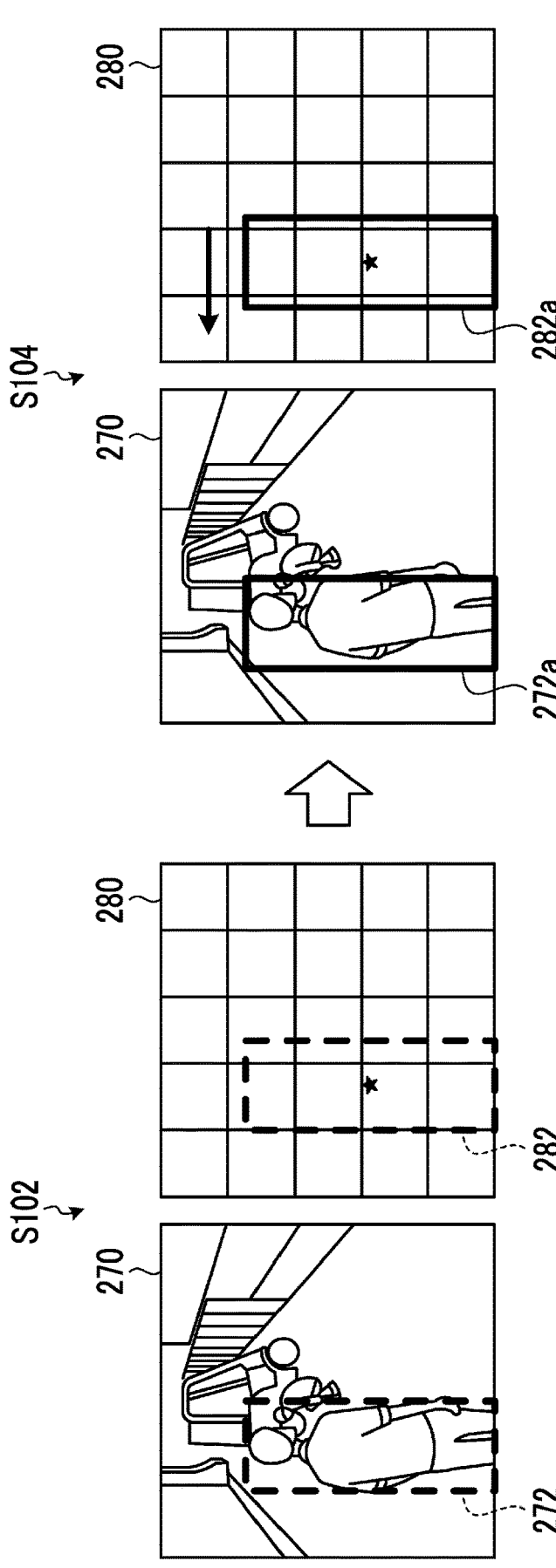
FIG. 7 is an explanatory diagram for explaining the processing of the training data creation unit.

FIG. 6 is a flowchart showing an example of the processing of the training data creation unit. FIG. 7 is an explanatory diagram for explaining the processing of the training data creation unit.

The training data creation unit 30 of the present embodiment determines area information of the training data, that is, position information of a bounding box, based on the position of an anchor that is used at the time of the deep learning. A method for creating the training data will be described using FIG. 6. The processing shown in FIG. 6 can be realized by executing the processing by the training data creation unit 30.

The training data creation unit 30 reads out anchor information (step S12). The anchor information is anchor information that is set to be used in the trained program, and is information on a size and an aspect ratio of an anchor with respect to a cell of a feature quantity map. The training data creation unit 30 reads out image data that includes area information of an object (step S14).

The training data creation unit 30 calculates IoU of an anchor of each cell and of a target area (step S16). The training data creation unit 30 specifies an anchor having the highest IoU (step S18). The training data creation unit 30 moves the position of area information, based on the anchor having the highest IoU (step S20), and ends the processing.

In an image 270 and a feature quantity map 280 shown in step S102 of FIG. 7, an area 282 on the division map 280 corresponding to a human display area 272 is obtained. The position in a right-left direction of the area 282 is located near the end portion of the cell of the feature quantity map 280. By executing the processing of FIG. 6, the training data creation unit 30 sets an area 282a as area information of an object, as in the image 270 and the feature quantity map 280 shown in step S104 of FIG. 7. The center of the area 282a is moved to the center of the cell as compared with the area 282. In this way, the area 282a becomes closer to an anchor that is set with the cell as a reference than in the area 282, and the degree of coincidence becomes higher. A display area 272a corresponding to the area 282a is in a state where a part of a person is not included as compared with the display area 272.

The training data creation unit 30 performs the above processing on the correct answer data that is included in the training data, so that the area information becomes information close to the anchor.

<Trained Program Creation Method>

Figure 8:
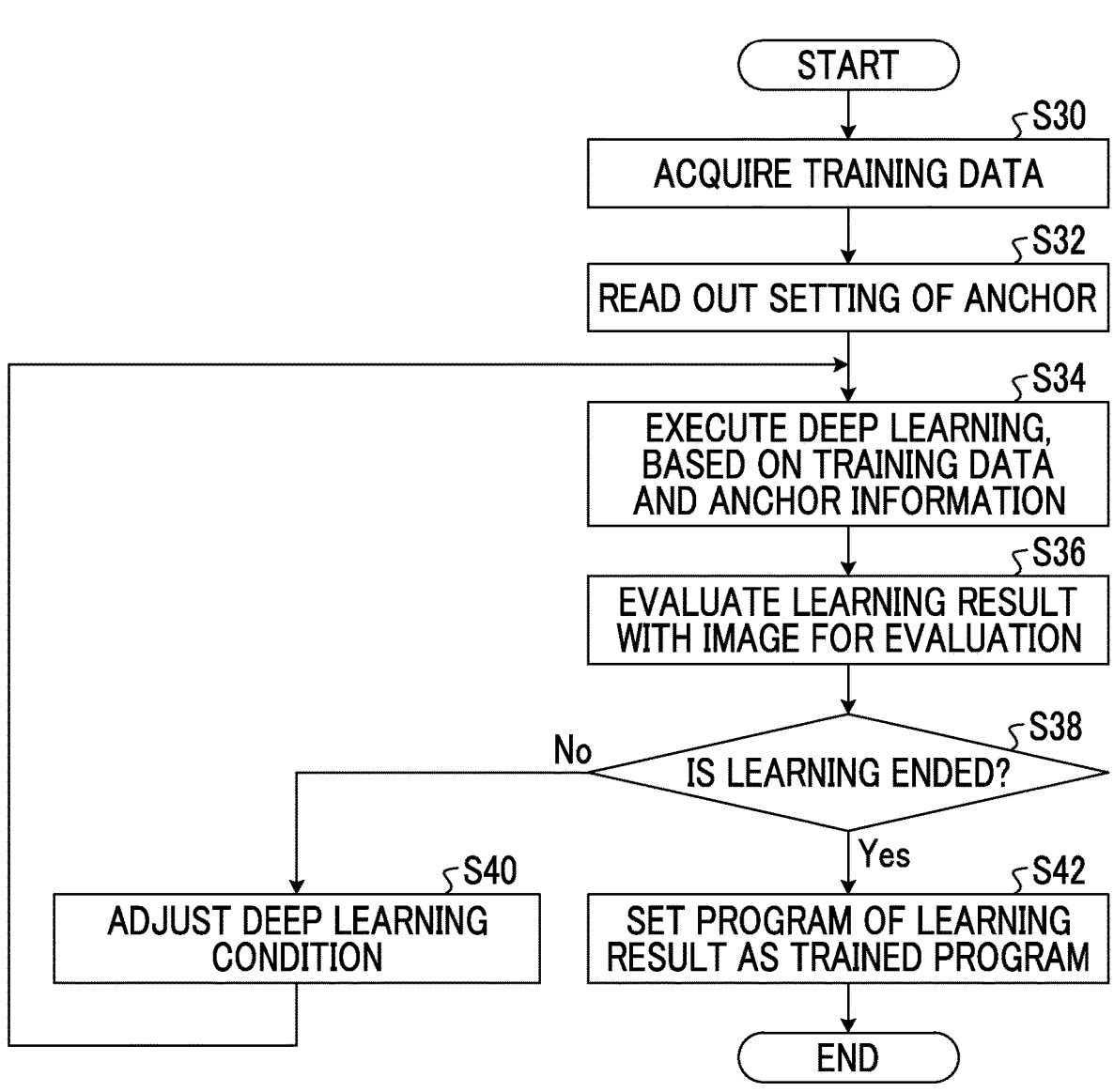
FIG. 8 is a flowchart showing an example of an operation of a learning unit.

FIG. 8 is a flowchart showing an example of an operation of the learning unit. The processing shown in FIG. 8 is executed by the learning unit 34 performing arithmetic processing on the learning execution program.

The learning unit 34 acquires training data including area information of an object (step S30). The learning unit 34 reads out the setting of an anchor (step S32). That is, the learning unit 34 reads out information on an anchor size and information on an aspect ratio set by the anchor setting unit 32. The learning unit 34 executes deep learning, based on the training data and the anchor information (step S34). The learning unit 34 sets a deep learning model with the image of the training data based on the anchor information, and performs learning of the image of the training data by using the set model. In this way, the learning unit 34 creates a trained program in which learning using the training data is executed.

The learning unit 34 evaluates the learning result with an image for evaluation (step S36). Here, the image for evaluation is a data set including both an image that includes an object and an image that does not include an object. The image for evaluation is associated with information indicating whether or not an object is included. The learning unit 34 performs detection of an object with respect to the image for evaluation with the trained program at the point in time of evaluation, so that whether an object of the image for evaluation in which an object is included can be detected, whether false detection that an object is included in the image for evaluation in which an object is not included is performed, or the like is evaluated. The learning unit 34 calculates a detection rate, a false detection rate, or the like as evaluation.

The learning unit 34 calculates the evaluation, and then determines whether or not to end the learning (step S38). The evaluation criterion for the end of learning can be set optionally, and, for example, the number of times of learning or the amount of calculation may be used as the criterion, and in a case where the detection rate and the false detection rate satisfy the set performance, the processing is ended.

In a case where it is determined that the learning is not ended (No in step S38), the learning unit 34 adjusts the conditions for the deep learning (step S40) and returns to step S34. In this way, the learning processing is executed again. Here, the conditions for the deep learning are not particularly limited. However, in step S34, as the learning program at the time of the start of learning, the current learning program may be set, or a part of the image of the training data may be replaced. In a case where it is determined that the learning is ended (Yes in step S38), the learning unit 34 sets the program of the learning result as the trained program (step S42), and ends the processing.

As described above, the learning unit 34 executes the deep learning processing by using the anchor set by the anchor setting unit 32, and creates the trained program.

<Object Detection Method>

Figure 9:
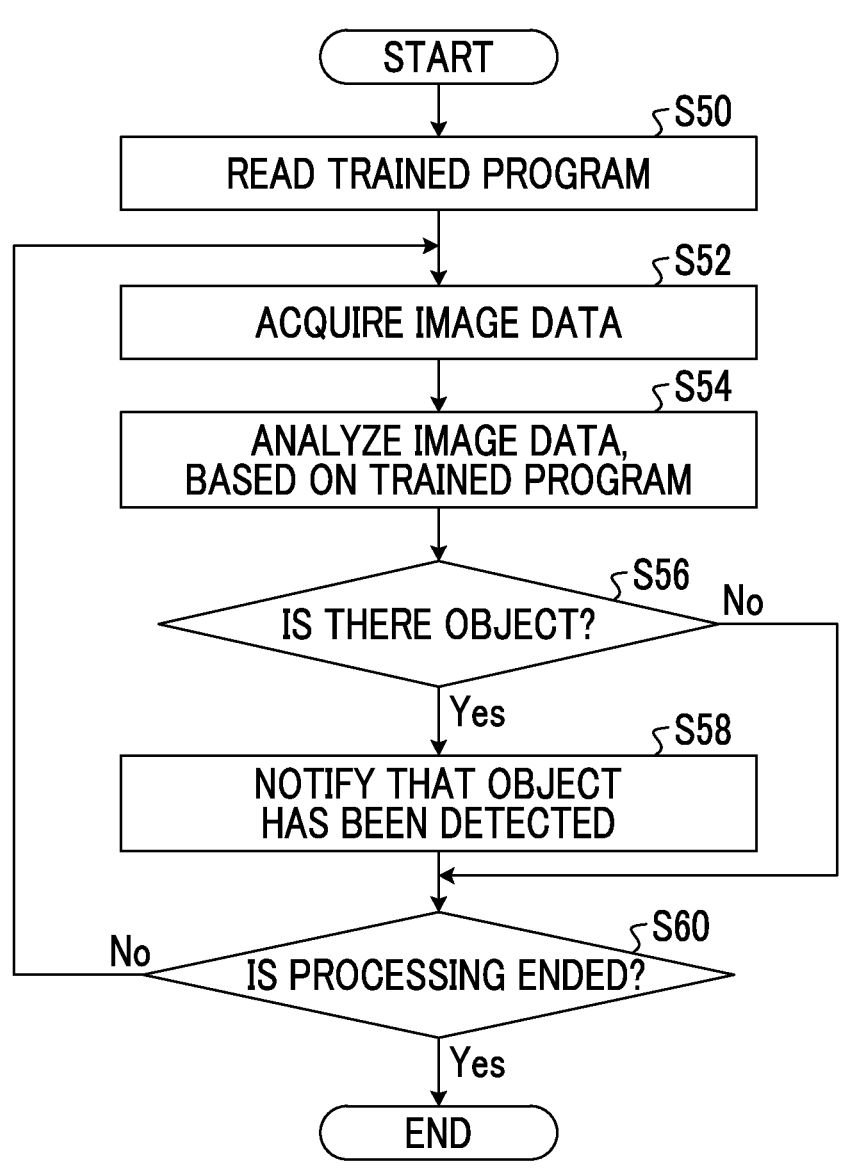
FIG. 9 is a flowchart showing an example of an operation of an object detection device.

Next, the object detection method using the trained program will be described using FIG. 9. FIG. 9 is a flowchart showing an example of an operation of the object detection device. The object detection device 102 executes the processing of FIG. 13 by processing the object detection program 120 via the calculation unit 114. The calculation unit 114 performs calculation using the trained program 122 at the time of processing by the object detection program 120. The processing of FIG. 9 will be described as processing that is executed in the object detection device 102. However, the image data may be supplied to the program creation device 10, and the same processing may be executed in the object detection processing unit 36.

The object detection device 102 reads the trained program (step S50). The object detection device 102 acquires the trained program created by the program creation device 10. The object detection device 102 acquires image data (step S52). Specifically, the object detection device 102 acquires an image with the camera unit 112.

The object detection device 102 analyzes the image data, based on the trained program (step S54). The object detection device 102 detects, in the calculation unit 114, whether an object is included in the image data, by using the trained program created by setting an anchor in the anchor setting unit 32 and performing the deep learning under the condition of the set anchor.

The object detection device 102 determines whether or not there is an object, from the analysis result of step S54 (step S56). In a case where it is determined that there is an object (Yes in step S56), the object detection device 102 notifies that the object has been detected, from the notification unit 118 (step S58). In a case where it is determined that there is no object (No in step S56), or after the processing of step S58 is executed, the object detection device 102 determines whether or not the processing is ended (step S60). In a case where it is determined that the processing is not ended (No in step S60), the object detection device 102 returns to step S52, acquires the next image data, and performs the object detection processing. In a case where it is determined that the processing is ended (Yes in step S60), the object detection device 102 ends this processing.

As described above, at the time of creation of the training data, the training data creation unit 30 sets area information of the object in the image, that is, position information of the bounding box of the correct answer data, based on the anchor position information. In this way, the object of the training data can be extracted with an anchor having a high coincidence rate, and the deep learning can be performed. That is, it is possible to suppress learning omission of training data. Further, it is possible to learn the area corresponding to the area of the anchor that is used at the time of analysis using the result of the deep learning. In this way, it is possible to create training data for creating a trained program with high object detection accuracy. Further, learning is performed based on the training data, so that it is possible to improve the object detection accuracy. Further, a system can be enhanced by processing of the training data, so that it is possible to improve the detection accuracy without increasing the amount of arithmetic processing.

The training data creation unit 30 can improve the detection accuracy by performing processing of bringing the frame of the area information closer to the set anchor. The training data creation unit 30 preferably sets the frame of the area information at a position that coincides with the anchor to be set. In this way, at the time of execution of detection processing, the processing of estimating the position of the object is simplified based on the evaluation value between the anchors, and the calculation is simplified.

<Modification Example of Training Data Creation Method>

In the above embodiment, as the training data, the position of the area information of the image data with which the area information is associated is moved based on the anchor information. However, there is no limitation thereto. The training data creation unit 30 may determine the position of the frame of the area information, based on the anchor information at the time of creating the training data, that is, at the time of executing the processing of specifying the position of the object of the image data.

Figure 10:
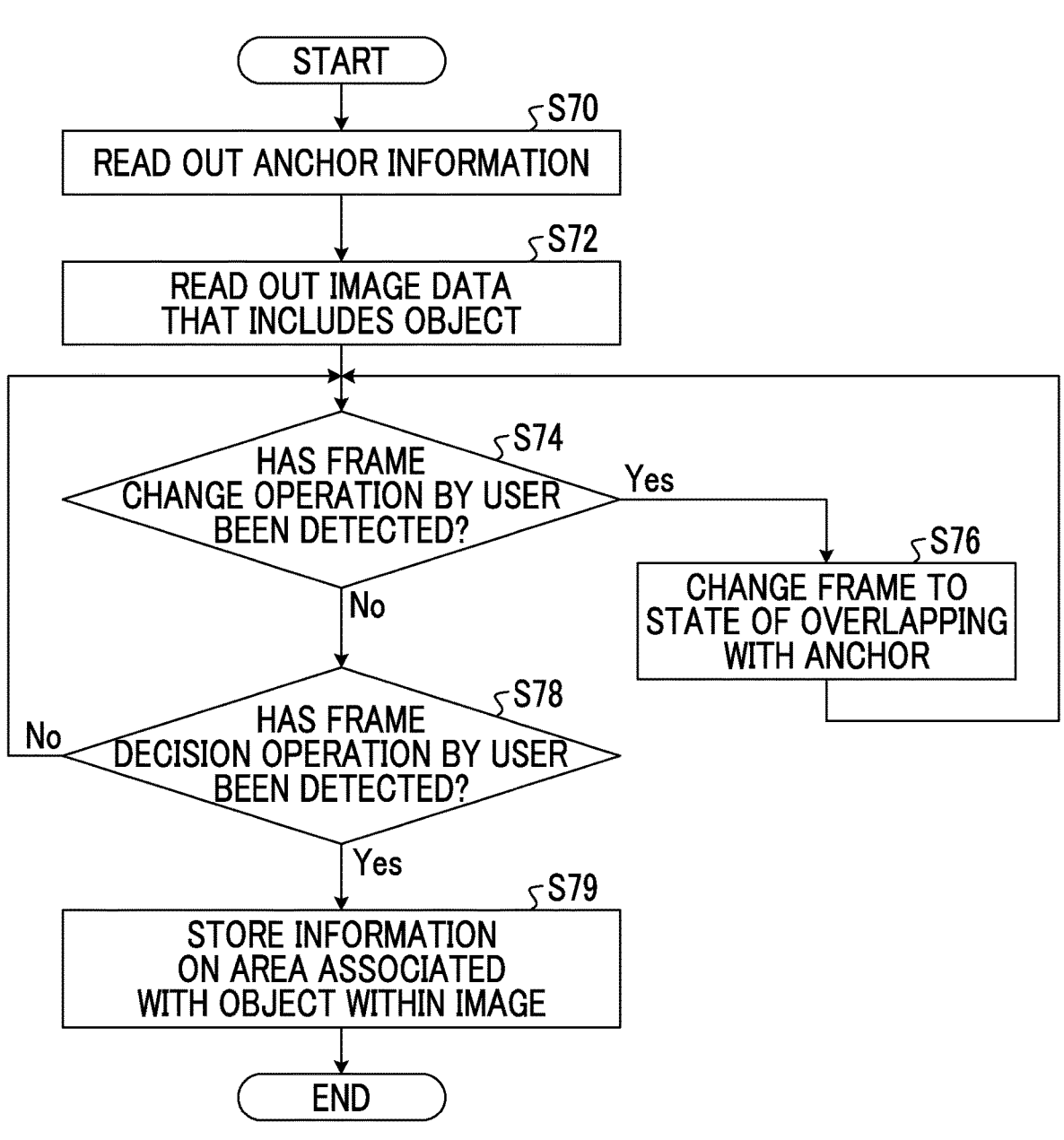
FIG. 10 is a flowchart showing another example of the processing of the training data creation unit.

FIG. 10 is a flowchart showing another example of the processing of the training data creation unit. The training data creation unit 30 reads out anchor information (step S70). The training data creation unit 30 reads image data that includes an object (step S72). The training data creation unit 30 determines whether or not a frame change operation by a user has been detected (step S74). Here, the user's operation is detected by the input unit 12. Further, as the frame change operation, there is an operation of moving the frame, an operation of changing the size of the frame with respect to the image, or an operation of changing the aspect ratio.

In a case where it is determined that the frame change operation by the user has been detected (Yes in step S74), the training data creation unit 30 changes the frame to a state of overlapping with the anchor (step S76).

Specifically, in a case where the user's operation is the movement of the frame, the frame is moved to the position where it overlaps with the anchor closest to a movement destination of the input operation. In a case where the user's operation is an operation of changing the size of the frame, the size is changed to any of the sizes of the anchors calculated in advance according to the number of divisions of the image. In a case where the user's operation is an operation of changing the aspect ratio of the frame, the shape is changed to any of the shapes of the set aspect ratio. In this way, the frame has a shape that overlaps with any of the set anchors.

In a case where it is determined that the frame change operation by the user has not been detected (No in step S74), the training data creation unit 30 determines whether or not a frame decision operation by the user has been detected (step S78). In a case where it is determined that the frame decision operation by the user has not been detected (No in step S78), the training data creation unit 30 returns to step S74 and detects the user's operation.

In a case where it is determined that the frame decision operation by the user has been detected (Yes in step S78), the training data creation unit 30 stores information on the area associated with the object within the image (step S79), and ends the processing. That is, the frame is set as a bounding box for the object that is included in the image. The training data creation unit 30 repeatedly performs the above processing on the image data, and creates the training data by associating the area information with a plurality of image data.

As described above, at the time of creation of the training data, the training data creation unit 30 sets area information of the object in the image, that is, position information of the bounding box of the correct answer data, based on the anchor position information. In this way, the object of the training data can be extracted with an anchor having a high coincidence rate, and the deep learning can be performed. That is, it is possible to suppress learning omission of training data. Further, it is possible to learn the area corresponding to the area of the anchor that is used at the time of analysis using the result of the deep learning. In this way, it is possible to create training data for creating a trained program with high object detection accuracy.

<Modification Example of Object Detection Method>

In the above embodiment, the area information associated with the image data of the training data is determined based on information on an anchor to improve the accuracy of detecting an object with an anchor. However, there is no limitation thereto. The object detection device 102 may detect an object by processing an evaluation value (a score) that is calculated when an object is detected from an image by using the trained program. Here, the evaluation value is a value obtained by calculating, by a dimensionless number from 0 to 1, a possibility that there is an object in the area set by an anchor. It is evaluated that the closer the evaluation value is to 1, the higher the probability that there is an object.

Figure 11:
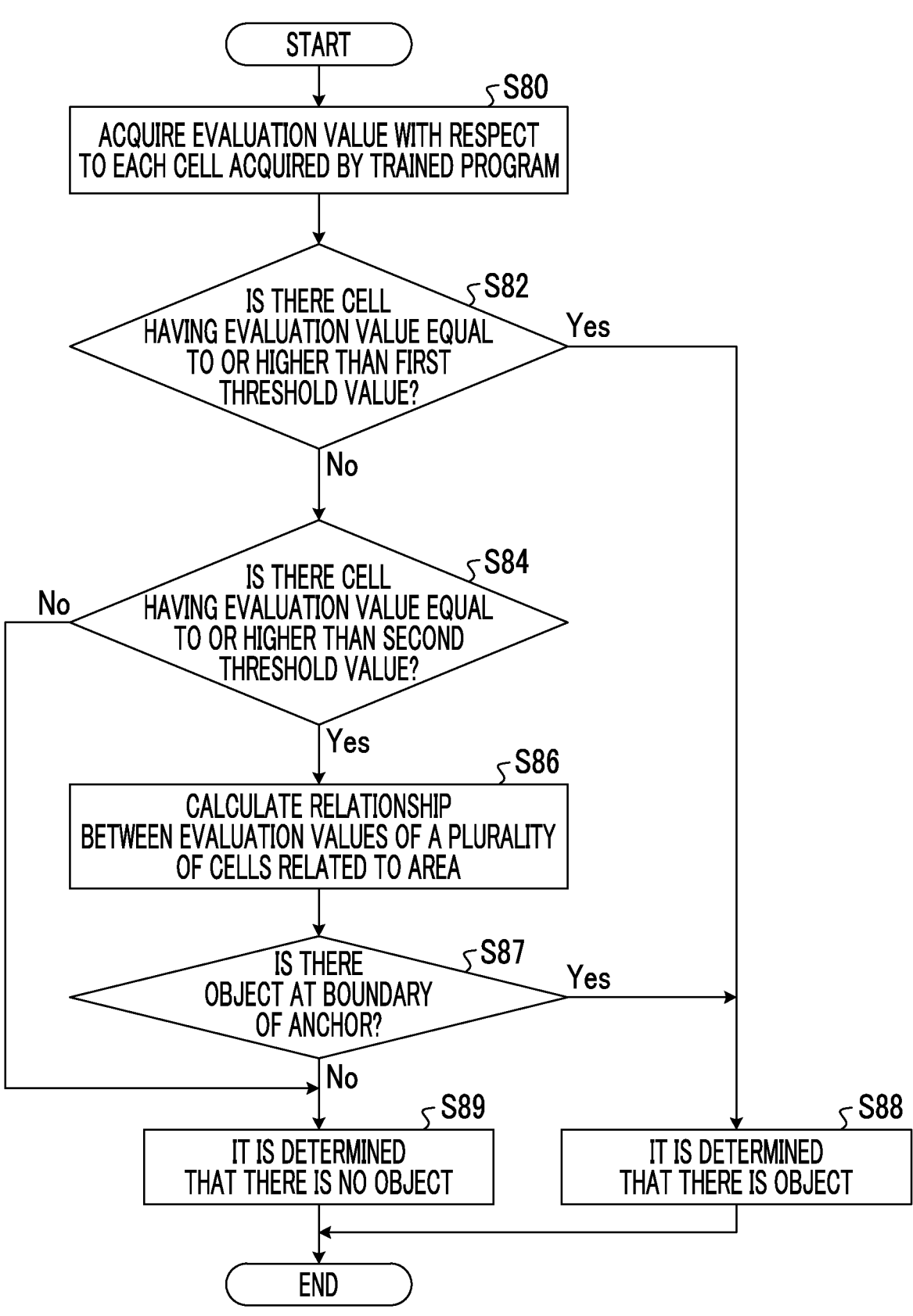
FIG. 11 is a flowchart showing another example of processing of the object detection device.
Figure 12:
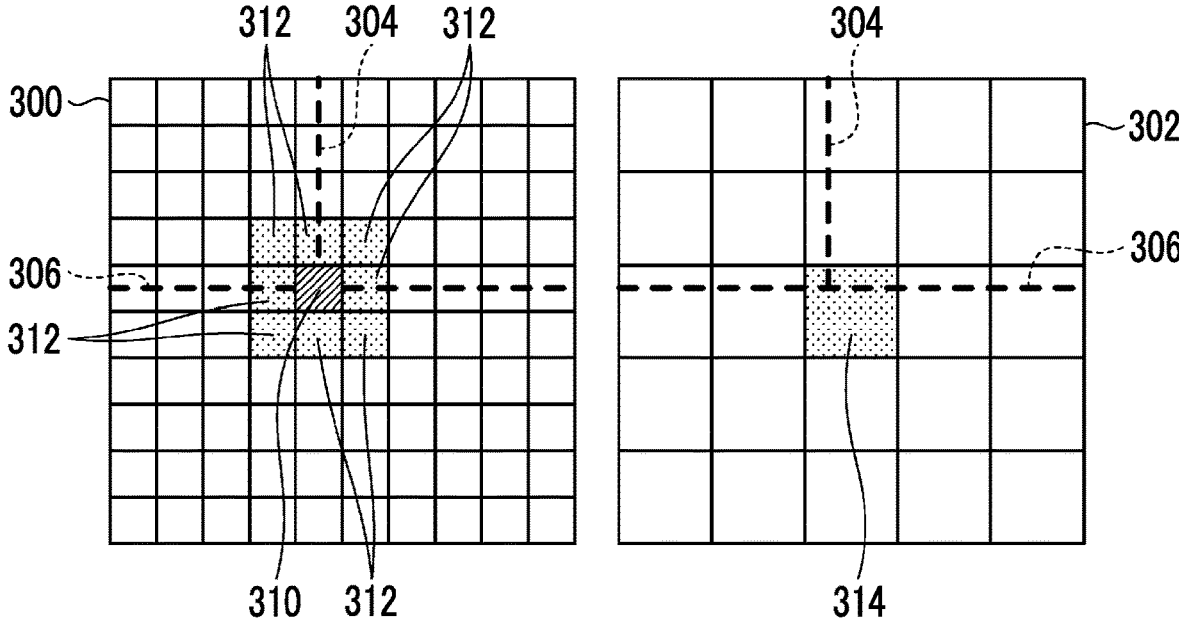
FIG. 12 is an explanatory diagram for explaining another example of the processing of the object detection device.

FIG. 11 is a flowchart showing another example of the processing of the object detection device. FIG. 12 is an explanatory diagram for explaining another example of the processing of the object detection device. It is favorable if the processing shown in FIG. 11 is executed as the determination processing of step S56 of processing the analysis result using the trained program of step S54 of FIG. 9. In a case of executing this processing, the object detection device 102 can obtain the effect even in the processing in which the processing shown in FIG. 6 is not executed. That is, the object detection device 102 may be executed by using a trained program that has been trained with training data that does not determine the position of a target area, based on the position of an anchor.

The object detection device 102 acquires an evaluation value with respect to each cell acquired by the trained program (step S80). Here, as the evaluation value, an evaluation value acquired in each cell of each feature quantity map is acquired. Further, an evaluation value with respect to one cell may be acquired as an evaluation value for each anchor, or an evaluation value obtained by integrating evaluations with a plurality of anchors with respect to one cell may be acquired.

The object detection device 102 determines whether or not there is a cell whose evaluation value is equal to or higher than a first threshold value (step S82). Here, the first threshold value is a lower limit value at which it can be evaluated that there is an object in an area of an anchor. As the first threshold value, 0.5 is exemplified. In a case where it is determined that there is a cell whose evaluation value is equal to or higher than the first threshold value (Yes in step S82), the object detection device 102 proceeds to step S88.

In a case where it is determined that there is no cell whose evaluation value is equal to or higher than the first threshold value (No in step S82), the object detection device 102 determines whether or not there is a cell whose evaluation value is equal to or higher than a second threshold value (step S84). Here, the second threshold value is a value lower than the first threshold value. The second threshold value is a lower limit value at which it can be determined that there is a possibility that an object is included, although in the evaluation value of one cell, it is not determined that there is an object. As the possibility that an object is included, a case where an object spans cells adjacent to each other, a case where an object is smaller than a cell, and a case where only part of an object is included in a cell are included. As the second threshold value, 0.3 is exemplified.

In a case where it is determined that there is no cell whose evaluation value is equal to or higher than the second threshold value (No in step S84), the object detection device 102 proceeds to step S89. In a case where it is determined that there is a cell whose evaluation value is equal to or higher than the second threshold value (Yes in step S84), the object detection device 102 calculates the relationship between the evaluation values of a plurality of cells related to an area (step S86). Specifically, in the object detection device 102, as shown in FIG. 12, in a case where a cell 310 of a feature quantity map 300 is set as a reference, the areas of eight cells 312 adjacent to the cell 310 in an up-down direction 304, a right-left direction 306, and a diagonal direction are the related cells. Further, in a feature quantity map 302 having a different number of divisions, a cell 314 in which the up-down direction 304 and the right-left direction 306 overlap with the cell 310 is also the related cell.

After calculating the relationship, the object detection device 102 determines whether or not there is an object at a boundary of an anchor (step S87). Specifically, the determination is made based on the cell relationship value calculated in step S86. In a case where the related cell also has a value equal to or higher than the second threshold value, the object detection device 102 determines that there is an object at a boundary with the cell having a value equal to or higher than the second threshold value. The determination criterion is not particularly limited, and a reference value may be set by accumulating the evaluation results of images in which an object is at a boundary of an anchor.

In a case where it is determined that there is an object at a boundary of an anchor (Yes in step S87), the object detection device 102 proceeds to step S88. In a case where it is determined that there is no object at a boundary of an anchor (No in step S87), the object detection device 102 proceeds to step S89.

In a case where the object detection device 102 makes a Yes determination in step S82 and a Yes determination in step S87, the object detection device 102 determines that there is an object (step S88) and ends the processing. In a case where the object detection device 102 makes a No determination in step S84 and a No determination in step S87, the object detection device 102 determines that there is no object (step S89) and ends the processing.

The object detection device 102 performs evaluation, based on the evaluation values of a cell and a cell related to the cell, by using the evaluation value of a cell calculated by using the trained program, so that it is possible to suitably detect a state where there is an object at a boundary of an anchor. In this way, it is possible to detect an object with higher accuracy. Further, as for the cell related to the cell, it is favorable if at least one cell is evaluated. Further, in the present embodiment, the related cell is evaluated. However, although the detection accuracy is lowered, in a case where there is a cell having a value equal to or higher than the second threshold value, it may be detected that there is an object at a boundary of an anchor.

<Modification Example of Object Detection Method>

Figure 13:
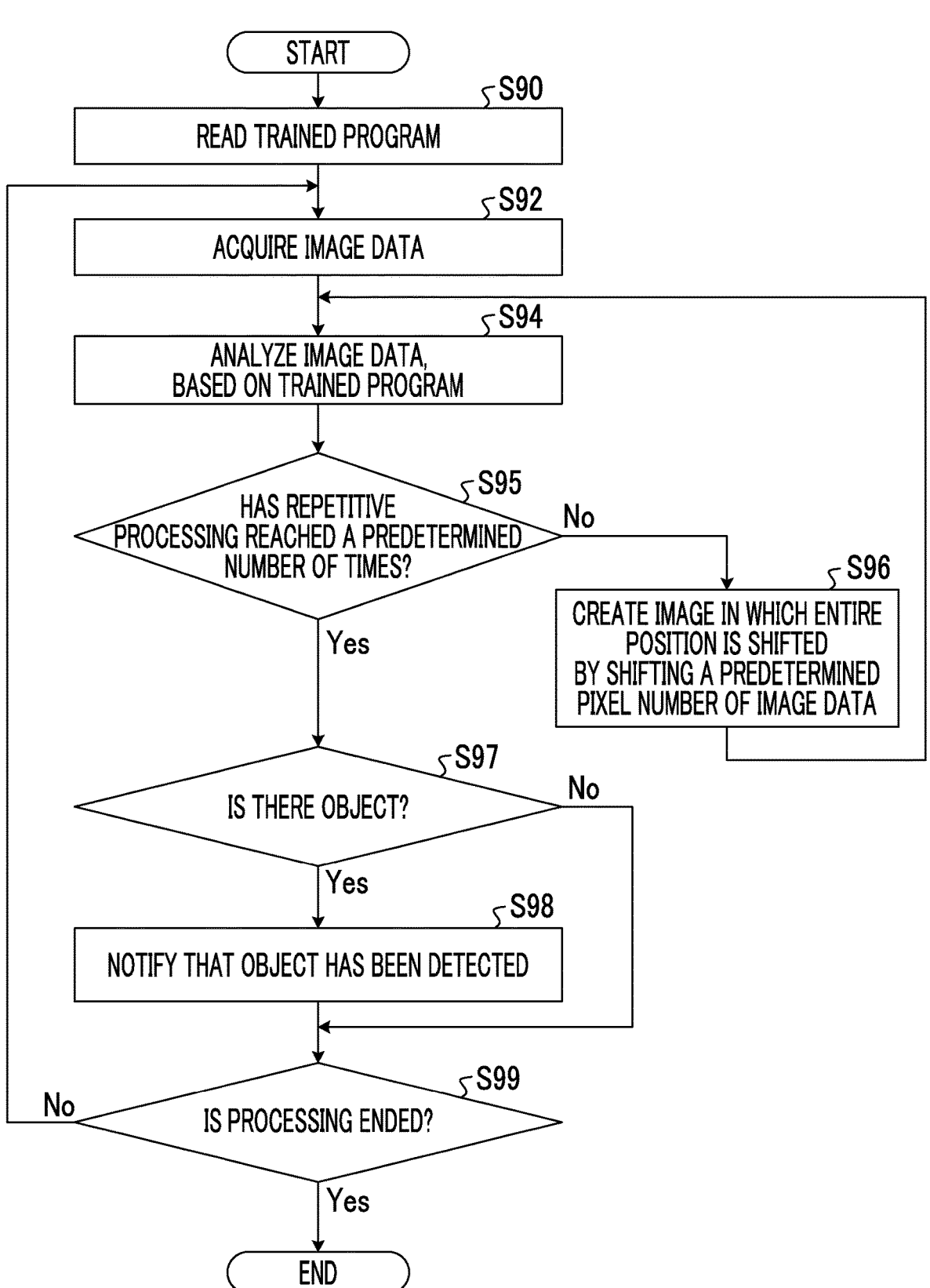
FIG. 13 is a flowchart showing another example of the processing of the object detection device.
Figure 14:
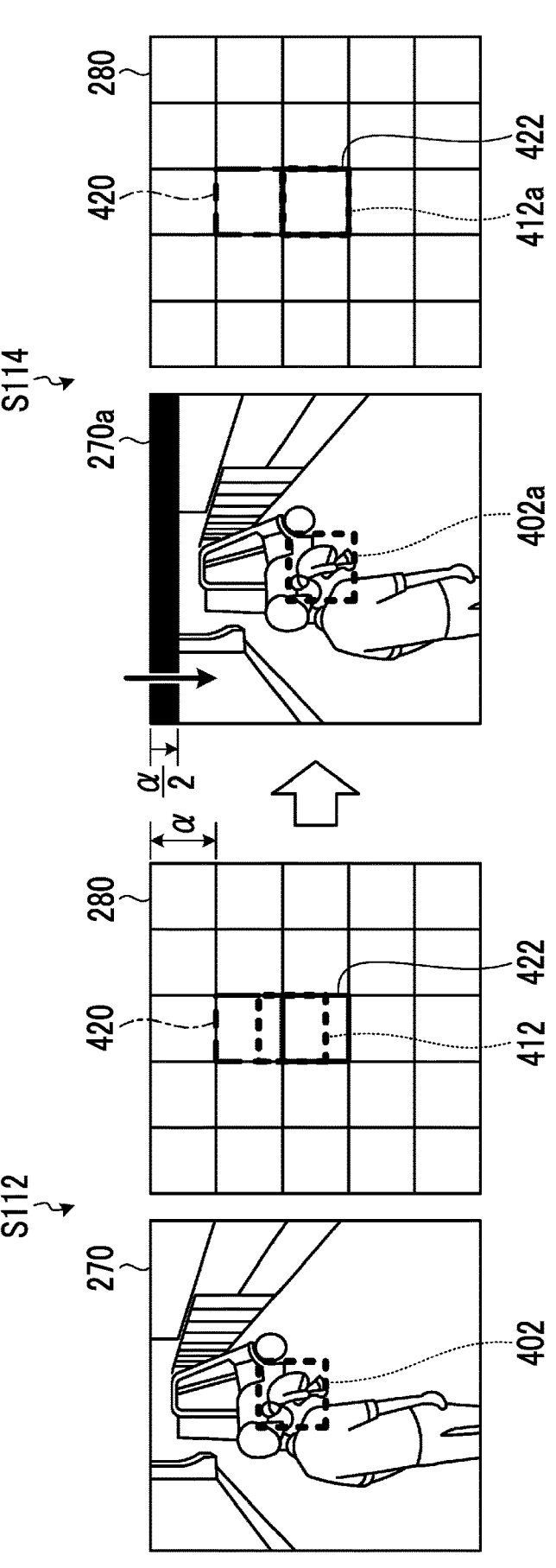
FIG. 14 is an explanatory diagram for explaining another example of the processing of the object detection device.

FIG. 13 is a flowchart showing another example of the processing of the object detection device. FIG. 14 is an explanatory diagram for explaining another example of the processing of the object detection device. The object detection device 102 executes the processing of FIG. 13 by processing the object detection program 120 via the calculation unit 114. The calculation unit 114 performs calculation using the trained program 122 at the time of processing by the object detection program 120.

The object detection device 102 can execute this processing in place of the processing of FIG. 9 described above. Further, in a case of executing this processing, the object detection device 102 can obtain the effect even in the processing in which the processing shown in FIG. 6 is not executed. That is, the object detection device 102 may be executed by using a trained program that has been trained with training data that does not determine the position of a target area, based on the position of an anchor.

The object detection device 102 reads the trained program (step S90). The object detection device 102 acquires the trained program created by the program creation device 10. The object detection device 102 acquires image data (step S92). Specifically, the object detection device 102 acquires an image with the camera unit 112.

The object detection device 102 analyzes the image data, based on the trained program (step S94). That is, the object detection device 102 processes the image data with the trained program to detect an object.

Next, the object detection device 102 detects an object and then determines whether or not repetitive processing has reached a predetermined number of times (step S95). In a case where it is determined that the repetitive processing has not reached a predetermined number of times (No in step S95), the object detection device 102 creates an image in which the entire position is shifted by shifting a predetermined number of cells of the image data (step S96), and returns to step S94. In this way, the object detection processing can be executed with respect to an image in which the positional relationship between an image and an anchor is shifted by a predetermined cell.

In a case where it is determined that the repetitive processing has reached a predetermined number of times (Yes in step S95), the object detection device 102 determines whether or not there is an object (step S97). In a case where it is determined that there is an object (Yes in step S97), the object detection device 102 notifies that an object has been detected, from the notification unit 118 (step S98).

In a case where it is determined that there is no object (No in step S97), or in a case where the processing of step S98 has been executed, the object detection device 102 determines whether or not the processing is ended (step S99). In a case where it is determined that the processing is not ended (No in step S99), the object detection device 102 returns to step S92, acquires the next image data, and performs object detection processing. In a case where it is determined that the processing is ended (Yes in step S99), the object detection device 102 ends this processing.

The object detection system 100 performs the processing of FIG. 13, so that it is possible to improve the accuracy of detecting an object by executing object detection processing by shifting the image data by a predetermined cell of the image data, specifically, by a pixel number smaller than a cell configuring one cell to be divided at the time of analysis.

In an image 270 and a feature quantity map 280 shown in step S112 of FIG. 14, an area 412 on the feature quantity map 280 corresponding to a human display area 402 is located across anchors 420 and 422. Therefore, in any of the anchors 420 and 422, there is a possibility that a person who is an object is not recognized. The pixel number on the image data of one cell of the feature quantity map 280 is a.

The object detection system 100 creates an image 270a whose position is shifted with respect to the image 270, and executes object detection processing. The image 270a shown in step S114 of FIG. 14 is an image moved downward by the pixel number of $\alpha/2$ with respect to the image 270. In a feature quantity map 280 of step S114 corresponding to the image 270a, an area 412a on the feature quantity map 280 corresponding to a human display area 402a overlaps with the anchor 422. In this way, it is possible to detect a human with the anchor 422.

In this manner, the object detection system 100 creates image data in which the position of the acquired image data is shifted, and repeatedly performs processing of extracting an object from the image data, so that even in a case where an object is between anchors in the image data at the time of capture, image data in which the position of an object overlaps with an anchor can be included in the image data of the repetitive processing. In this way, it is possible to improve the accuracy of detecting an object.

The amount of shifting an image is not particularly limited. For example, in a case where the size of an object is limited to a certain range in image data, the maximum cell size of the feature quantity map having a high probability of covering the range is set as a, so that it is possible to suppress the setting of the shift amount considering even a cell size that does not correspond to the size of an object. As in the present embodiment, an amount corresponding to a pixel of the shift amount of $\alpha/2$, that is, half of one cell of the feature quantity map, is set as a movement amount, so that an object existing at a boundary can be moved to the vicinity of the center of an anchor, and therefore, it is possible to efficiently detect an object at a boundary of an anchor. Further, in the present embodiment, an image is shifted in the up-down direction. However, the image may be shifted in the right-left direction or the diagonal direction.

REFERENCE SIGNS LIST

10: program creation device
12: input unit
14: output unit
16: calculation unit
18: storage unit
30: training data creation unit
32: anchor setting unit
34: learning unit
36: object detection processing unit
40: image data
42: setting data
44: learning execution program
46: anchor setting program
48, 120: object detection program
50, 122: trained program
100: object detection system
102: object detection device
112: camera unit
114: calculation unit
116: storage unit
118: notification unit

The invention claimed is:

1. A program creation device comprising:
a data creation device; and
a learning unit that performs deep learning on training data created by the data creation device to create a trained program for extracting an object from an image, wherein
the data creation device is a training data creation device for creating the training data which is used for the deep learning of an object detection program for detecting whether or not the object is included in the image, and comprises:
an acquisition unit that acquires an anchor that is information on a frame specifying an area for each cell for detecting presence or absence of the object from the image; and
a creation unit that associates area information of the object with image data to create the training data that includes a plurality of image data in which the area information is included, and
the creation unit determines a frame of the area information, based on a position of the anchor, calculates a degree of coincidence between an anchor and a target area in a case of being placed at each position of the image data, and moves the frame of the target area in a direction approaching an outer shape of the anchor having a highest degree of coincidence.

2. The program creation device according to claim 1, wherein the creation unit sets the frame of the area information at a position overlapping with the anchor.

3. The program creation device according to claim 1, wherein the creation unit performs at least one of moving the frame of the area information, changing a size of the frame with respect to the image, and changing an aspect ratio, based on a position of the anchor.

4. An object detection device comprising:
a storage unit that stores the trained program created by the program creation device according to claim 1; and
a calculation unit that executes the trained program stored in the storage unit, processes image data of an area that is included in an anchor set with respect to a cell, and executes object detection processing from the image data, wherein
the calculation unit executes the trained program with respect to the image data, calculates a score in each cell, and determines that there is an object in a case where there is a cell whose score is equal to or higher than a first threshold value, and
determines that there is an object at a boundary of an anchor when the score satisfies a predetermined condition, based on a score of a cell and a score of a cell related to the cell, in a case where there is no cell whose score is the first threshold value.

5. The object detection device according to claim 4, wherein the calculation unit determines that there is an object at a boundary of the anchor in a case where both the score of the cell and the score of the cell related to the cell are lower than the first threshold value and equal to or higher than a second threshold value higher than 0.

6. The object detection device according to claim 4, wherein the cell and the cell related to the cell are cells adjacent to each other.

7. The object detection device according to claim 6, wherein the cells adjacent to each other include at least one cell of four cells adjacent to a reference cell in up-down and right-left directions.

8. The object detection device according to claim 4, wherein the cell and the cell related to the cell include a cell of an area in which at least a part overlaps in image data having a different number of divisions.

9. An object detection device comprising:
a storage unit that stores a trained program created by associating area information of an object with image data and performing deep learning on training data that includes a plurality of image data in which the area information is included; and
a calculation unit that executes the trained program stored in the storage unit, processes image data of an area that is included in an anchor set with respect to a cell, and executes object detection processing from the image data, wherein
the calculation unit executes the trained program with respect to the image data, calculates a score in each cell, creates image data in which a position of the image data is moved by a distance shorter than the cell in which an anchor is installed, executes the trained program, repeats processing of calculating the score in each cell, and executes the object detection processing from the image data, based on score calculation results with respect to a plurality of image data whose positions have been moved.

10. The object detection device according to claim 9, wherein the calculation unit sets the distance shorter than the cell in which the anchor is installed to be half the distance of the cell.

11. A data creation method for creating training data which is used for deep learning of an object detection program for detecting whether or not an object is included in an image, the method comprising:
a step of acquiring an anchor which is information on a frame specifying an area for each cell for detecting presence or absence of the object from the image; and
a step of associating area information of the object with image data to create training data that includes a plurality of image data in which the area information is included, wherein
in the step of creating the training data, a frame of the area information is determined based on a position of the anchor.

12. An object detection method comprising:
a step of storing a trained program created by associating area information of an object with image data and performing deep learning on training data that includes a plurality of image data in which the area information is included; and
a step of executing the stored trained program, processing image data of an area that is included in an anchor set with respect to a cell, and executing object detection processing from the image data, wherein
in the step of executing object detection processing, the trained program is executed with respect to the image data, a score of each cell is calculated, and in a case where there is a cell whose score is equal to or higher than a first threshold value, it is determined that there is an object, and
in a case where there is no cell whose score is the first threshold value, it is determined that there is an object at a boundary of the anchor when the score satisfies a predetermined condition, based on a score of a cell and a score of a cell related to the cell.

13. An object detection method comprising:
a step of storing a trained program created by associating area information of an object with image data and performing deep learning on training data that includes a plurality of image data in which the area information is included; and
a step of executing the stored trained program, processing image data of an area that is included in an anchor set with respect to a cell, and executing object detection processing from the image data, wherein
in the step of executing object detection processing, the trained program is executed with respect to the image data, a score of each cell is calculated, image data in which a position of the image data is moved by a distance shorter than the cell in which an anchor is installed is created, the trained program is executed, processing of calculating a score in each cell is repeated, and the object detection processing is executed from the image data, based on score calculation results with respect to a plurality of image data whose positions have been moved.

14. An object detection device comprising:
a storage unit that stores a trained program created by associating area information of an object with image data and performing deep learning on training data that includes a plurality of image data in which the area information is included; and a calculation unit that executes the trained program stored in the storage unit, processes image data of an area that is included in an anchor set with respect to a cell, and executes object detection processing from the image data, wherein the calculation unit executes the trained program with respect to the image data, calculates a score in each cell, and determines that there is an object in a case where there is a cell whose score is equal to or higher than a first threshold value, and determines that there is an object at a boundary of an anchor when the score satisfies a predetermined condition, based on a score of a cell and a score of a cell related to the cell, in a case where there is no cell whose score is the first threshold value.

15. The object detection device according to claim 14, wherein the calculation unit determines that there is an object at a boundary of the anchor in a case where both the score of the cell and the score of the cell related to the cell are lower than the first threshold value and equal to or higher than a second threshold value higher than 0.

16. The object detection device according to claim 14, wherein the cell and the cell related to the cell are cells adjacent to each other.

17. The object detection device according to claim 16, wherein the cells adjacent to each other include at least one cell of four cells adjacent to a reference cell in up-down and right-left directions.

18. The object detection device according to claim 14, wherein the cell and the cell related to the cell include a cell of an area in which at least a part overlaps in image data having a different number of divisions.

\* \* \* \* \*